(12) United States Patent  
Miller (10) Patent No.: US 7,375,927 B1
(45) Date of Patent: May 20, 2008

(54) LAMINATED HEADLIFT STRUCTURE FOR DISK DRIVE SUSPENSIONS

(75) Inventor: Mark A. Miller, Darwin, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 358 days.

(21) Appl. No.: 11/116,541

(22) Filed: Apr. 28, 2005

(51) Int. Cl.
*G11B 5/48* (2006.01)

(52) U.S. Cl. ................. 360/244.3; 360/244.9
(58) Field of Classification Search ............ 360/244.3, 360/244.2, 244.9, 245.1, 245.7
See application file for complete search history.

(56) References Cited

U.S. PATENT DOCUMENTS

| | | | |
|---|---|---|---|
| 5,027,241 A | 6/1991 | Hatch et al. | |
| 5,187,625 A | 2/1993 | Blaeser et al. | |
| 5,291,359 A | 3/1994 | Wolter | |
| 5,339,208 A | 8/1994 | Yumura et al. | |
| 5,463,514 A | 10/1995 | Yaeger | |
| 5,471,734 A | 12/1995 | Hatch et al. | |
| 5,526,206 A | 6/1996 | Shimizu | |
| 5,734,526 A * | 3/1998 | Symons | 360/244.3 |
| 5,739,982 A * | 4/1998 | Arya et al. | 360/234.5 |
| 5,793,569 A * | 8/1998 | Christianson et al. | 360/244.3 |
| 5,850,319 A | 12/1998 | Tangren | |
| 5,862,010 A * | 1/1999 | Simmons et al. | 360/97.01 |
| 5,894,655 A | 4/1999 | Symons | 29/603.03 |
| 5,969,906 A * | 10/1999 | Arya et al. | 360/245 |
| 6,023,574 A | 2/2000 | Tangren | |
| 6,052,258 A * | 4/2000 | Albrecht et al. | 360/245.2 |
| 6,151,197 A | 11/2000 | Larson et al. | |
| 6,157,520 A | 12/2000 | Mangold et al. | |
| 6,215,622 B1 | 4/2001 | Ruiz et al. | |
| 6,219,203 B1 * | 4/2001 | Arya et al. | 360/244.2 |
| 6,239,953 B1 | 5/2001 | Mei | |
| 6,278,585 B1 * | 8/2001 | Olson et al. | 360/264.2 |
| 6,351,348 B1 * | 2/2002 | Erpelding et al. | 360/244.3 |
| 6,362,933 B1 | 3/2002 | Sampietro et al. | |
| 6,463,514 B1 | 10/2002 | Ray et al. | |
| 6,538,850 B1 | 3/2003 | Hadian et al. | |
| 6,700,745 B2 | 3/2004 | Shiraishi | |
| 6,757,137 B1 * | 6/2004 | Mei | 360/245.7 |
| 6,785,094 B2 * | 8/2004 | Arya et al. | 360/244.3 |
| 6,977,798 B2 * | 12/2005 | Schulz et al. | 360/244.3 |
| 2002/0109943 A1 * | 8/2002 | Crane et al. | 360/244.3 |
| 2003/0002220 A1 * | 1/2003 | Nojima | 360/244.9 |
| 2003/0202282 A1 * | 10/2003 | Arya | 360/244.2 |
| 2004/0120076 A1 * | 6/2004 | Takagi et al. | 360/244.2 |
| 2005/0052784 A1 * | 3/2005 | Inoue et al. | 360/244.2 |
| 2005/0188531 A1 * | 9/2005 | Shu et al. | 29/603.03 |
| 2005/0201014 A1 * | 9/2005 | Fujimoto et al. | 360/244.2 |

FOREIGN PATENT DOCUMENTS

| | | |
|---|---|---|
| JP | 2000011571 A | 1/2000 |
| KR | 98004812 A | 6/1996 |

* cited by examiner

*Primary Examiner*—William J Klimowicz
(74) *Attorney, Agent, or Firm*—Faegre & Benson LLP (57) ABSTRACT

A head suspension load beam including a beam region and a headlift formed by etching from a laminated sheet of material having first and second stainless steel layers separated by a polyimide layer. The beam region includes a base portion formed from the first stainless steel layer and a stiffener portion formed from the second stainless steel layer. The headlift extends from the beam region and includes an offset region and a concave tab. The offset region is formed from the first and second stainless steel layers and the polyimide layer. The tab extends from the offset region and is formed from only the second stainless steel layer.

20 Claims, 10 Drawing Sheets

LAMINATED HEADLIFT STRUCTURE FOR DISK DRIVE SUSPENSIONS

FIELD OF THE INVENTION

The invention relates generally to suspensions for supporting data access heads with respect to storage media. In particular, the invention is a headlift and load beam for a disk drive head suspension.

BACKGROUND OF THE INVENTION

Head suspensions for disk drives and other dynamic data storage devices are generally known and disclosed, for example, in the Tangren U.S. Pat. No. 5,850,319 and the Ruiz et al. U.S. Pat. No. 6,215,622.

An important performance-related criteria of a suspension is specified in terms of its resonance characteristics. For example, in order for the suspension to accurately position a read/write head slider with respect to a desired track on a magnetic disk, the suspension must be capable of precisely translating or transferring the motion of a positioning arm to the slider. An inherent property of moving mechanical systems, however, is their tendency to bend and twist in a number of different modes when driven back and forth at certain rates known as resonant frequencies. Any such bending or twisting of a suspension can cause the position of the head slider to deviate from its intended position with respect to the desired track. Since the head suspension assemblies must be driven at high rates of speed in high performance disk drives, it is desirable for the resonant frequencies of a suspension to be as high as possible. The detrimental effects of the bending and twisting at the resonance frequencies can also be reduced by minimizing the extent of the bending and twisting motion of the suspension (also known as the gain) at the resonant frequencies.

Common bending and twisting modes of suspensions are generally known and described, for example, in the Yumura et al. U.S. Pat. No. 5,339,208 and the Hatch et al. U.S. Pat. No. 5,471,734. Modes which result in lateral or transverse motion (also known as off-track motion) of the head slider are particularly detrimental since this motion causes the head slider to move from the desired track on the disk toward an adjacent track. The three primary modes which produce this transverse motion are known as the sway, first torsion and second torsion modes. The sway mode is a lateral bending mode (i.e., the suspension bends in the transverse direction along its entire length. The first and second torsion modes are twisting modes during which the suspension twists about a rotational axis which extends along the length of the suspension.

Various techniques for compensating for the detrimental effects of resonance modes are known and disclosed, for example, in the Yumura et al. and Hatch et al. U.S. patents mentioned above, as well as the Tangren U.S. Pat. No. 6,023,574. There remains, however, a continuing need for suspensions having improved resonance characteristics. Suspensions of this type that can be efficiently manufactured would be especially desirable.

Headlifts are well known components or features of disk drive head suspensions. Briefly, in some applications the headlift is used only during manufacturing operations to merge the suspension into place with respect to the disk. In other applications, the headlift is engaged and used by other structures of the disk drive during its operation to load the suspension onto and unload the suspension from the spinning disk. Headlifts and related structures are disclosed, for example, in Japanese patent document no. 2,000,011,571, South Korean patent document no. 98,004,812 and in the following U.S. patent documents.

| Inventor | U.S. Pat. No. |
|---|---|
| Hatch et al. | 5,027,241 |
| Blaeser et al. | 5,187,625 |
| Wolter | 5,291,359 |
| Yaeger | 5,463,514 |
| Shimizu | 5,526,206 |
| Larson et al. | 6,151,197 |
| Mangold et al. | 6,157,520 |
| Mei | 6,239,953 |
| Sampietro et al. | 6,362,933 |
| Ray et al. | 6,463,514 |
| Hadian et al. | 6,538,850 |
| Shirashi | 6,700,745 |

There remains a continuing need for improved headlift structures for disk drive suspensions. In particular, there is a need for headlifts that are stiff, but provide little, if any, detrimental impact on the resonance characteristics of the suspension. To be commercially viable, any such headlift should be capable of being efficiently manufactured.

SUMMARY OF THE INVENTION

The present invention is an improved headlift for disk drive suspensions that is formed by etching from a laminated sheet of material having first and second relatively stiff layers separated by a third etch stop layer. One embodiment of the headlift includes a support region and a tab. The support region includes at least portions formed from the first, second and third layers of the laminated sheet. The tab extends from the support region and is formed from only one of the first and second relatively stiff layers, and optionally from the etch stop layer. Another embodiment of the invention includes an offset region between the support region and the tab. At least portions, and optionally all, of the offset region is formed from the first, second and third layers of the laminated sheet.

DETAILED DESCRIPTION OF THE PREFERRED EMBODIMENTS

Figure 1:
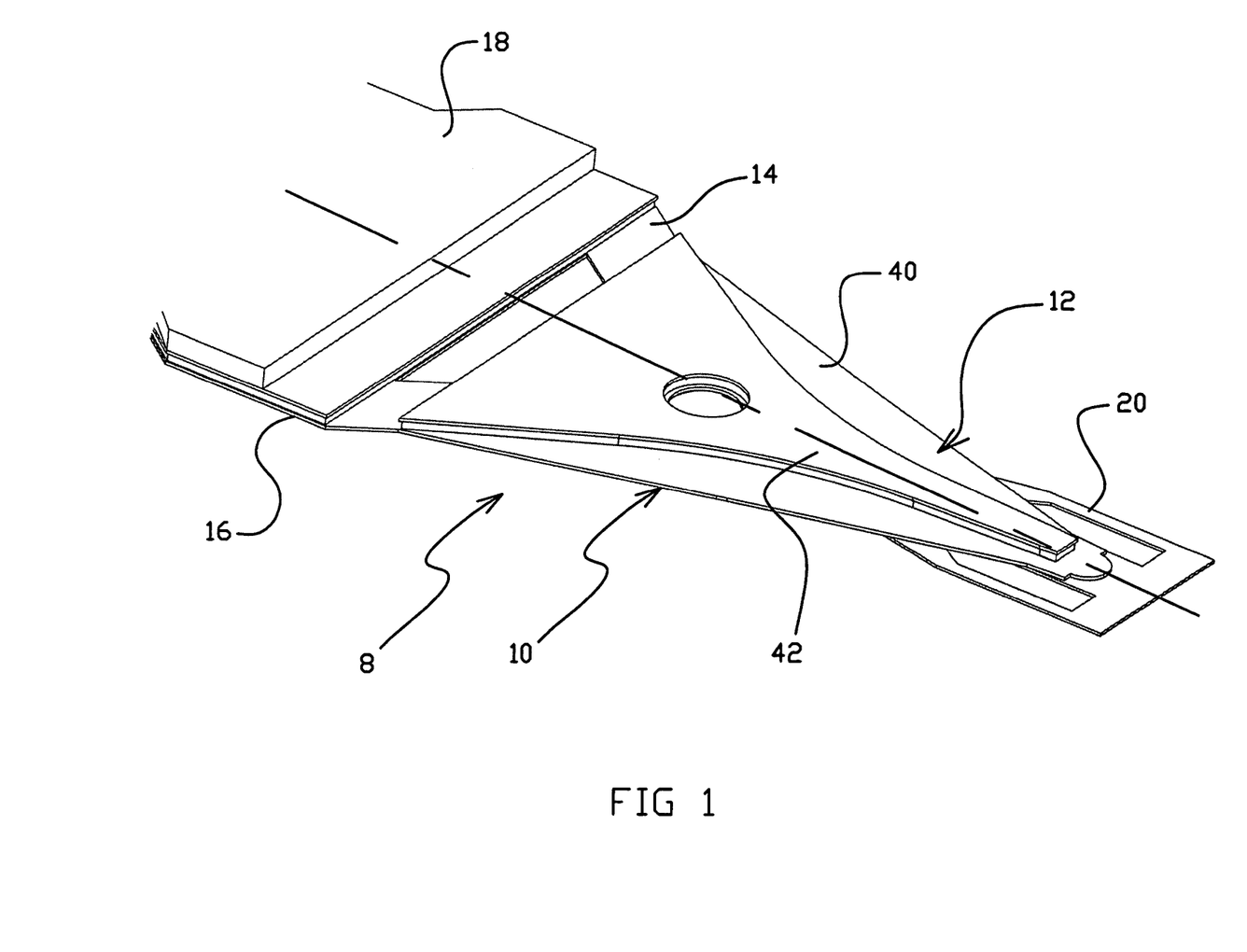
FIG. 1 is an isometric view of a portion of a suspension having a first load beam onto which a headlift in accordance with the present invention can be incorporated.
Figure 3:
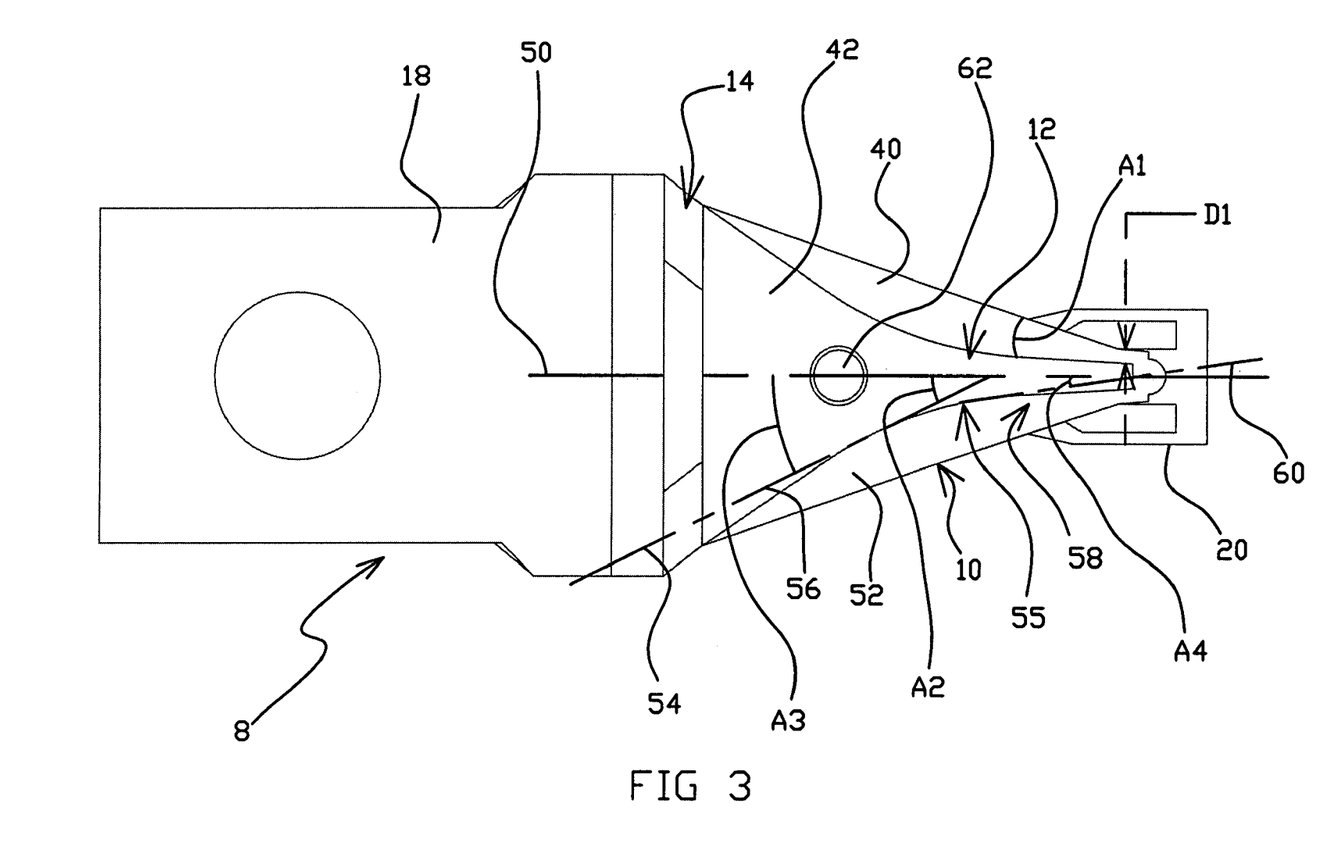
FIG. 3 is a top plan view of the suspension shown in FIG. 1.

A suspension assembly 8 including a first load beam 10 onto which a headlift in accordance the present invention (described below) can be incorporated is illustrated in FIGS. 1 and 3. As shown, the load beam 10 has a relatively rigid beam region 12, a radius or spring region 14, and a mounting region 16 at its proximal end. A base plate 18 is mounted to the mounting region 16 of the load beam, and a flexure 20 (e.g., an integrated lead or wireless flexure) is mounted to the beam region 12. The base plate 18 and flexure 20 can be of any known or otherwise conventional design, and can be attached to the load beam 10 by welding or other known methods.

Figure 2:
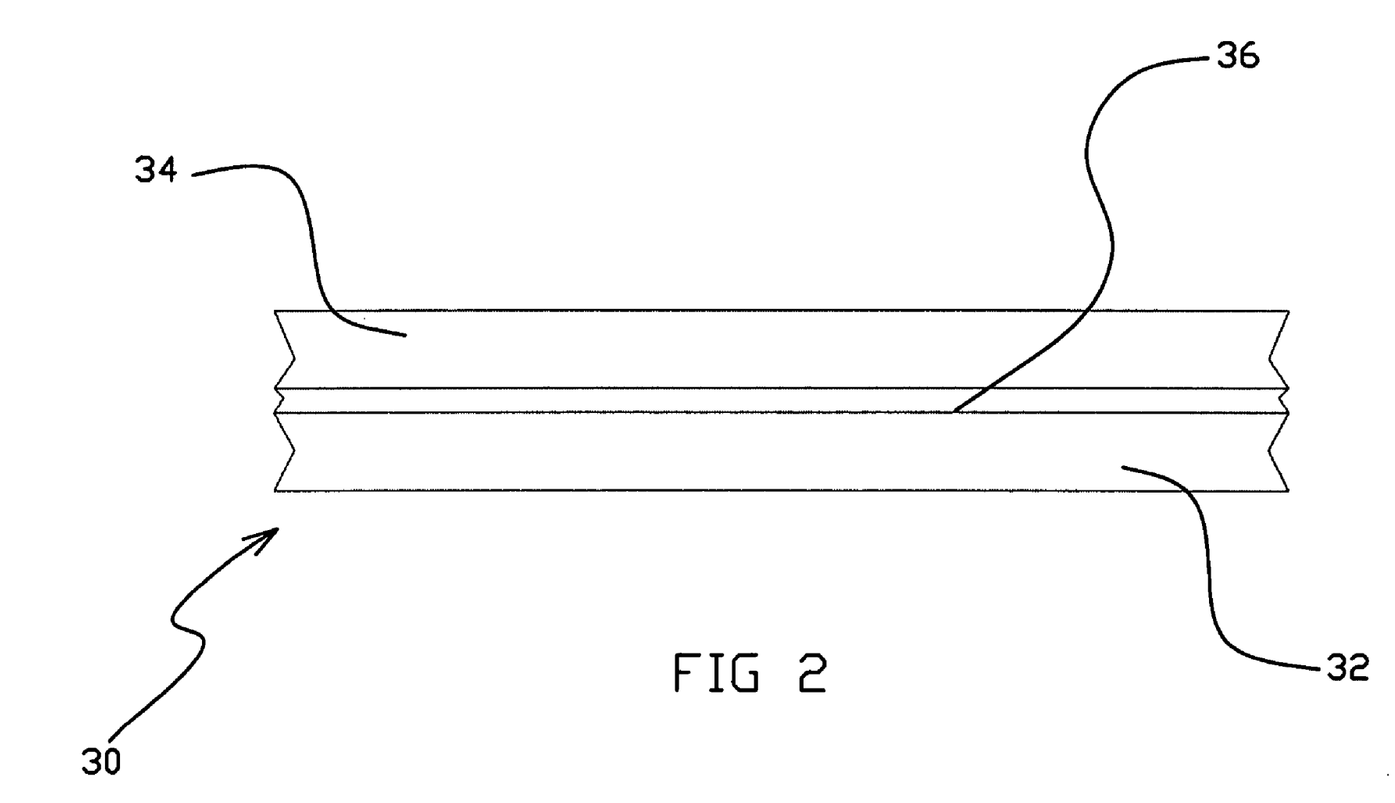
FIG. 2 is a cross sectional illustration of a portion of a laminated sheet of material from which the load beam of the suspension shown in FIG. 1 and the headlift of the invention can be manufactured.

Load beam 10 is preferably manufactured from a laminated sheet of material 30 such as that shown in FIG. 2. Materials such as 30 are well known and commercially available. Material 30 includes a first layer 32 of stainless steel or other spring metal, a second layer 34 of stainless steel or other relatively stiff material, and an etch stop layer 36 of polyimide or other (typically electrically insulating) material between the first and second layers. Conventional or otherwise known photolithography and etching processes can be used to manufacture the load beam 10 from laminated material 30. Thicknesses of first layer 32 and second layer 34 can range between about 10 and 38 μm, and about 10 and 76 μm, respectively. In one embodiment the thickness of first layer 32 is about 25 μm, and the thickness of second layer 34 about 25 μm. Etch stop layer 36 can have a thickness in the range of about 10 and 127 μm, and is about 76 μm in one embodiment. Materials 30 having layers 32, 34 and/or 36 with thicknesses outside these ranges can also be used.

Referring to FIGS. 1-3, the beam region 12 of load beam 10 includes a first or base portion 40 and a second or stiffener portion 42. In the illustrated embodiment, base portion 40 is formed from the first layer 32 of the laminated material 30, and stiffener portion 42 is formed from the second layer 34 of the laminated material. The etch stop layer 36 can be used in connection with the photolithography and etching processes to form the base portion 40 and stiffener portion 42 into different shapes. Mounting region 16 is formed from both the first layer 32 and second layer 34 of the laminated material 30 in the illustrated embodiment. In other embodiments (not shown) the mounting region 16 can be formed from the second layer 34 of the laminated material. Although shown as a separately formed and subsequently attached member in FIG. 1, portions or the whole of base plate 18 can be formed from the second layer 34 of the laminate material in other embodiments (not shown). In still other embodiments (not shown) the base portion 40, stiffener portion 42 and/or mounting region 16 can be formed from separate elements that are attached to one another (e.g., by welding). Spring region 14 of the load beam 10 is formed from the first layer 32 of the laminated material 30 in the illustrated embodiment. In other embodiments (not shown) the spring region 14 can be formed from the second layer 34 (e.g., the same layer from which the stiffener portion 42 is formed), or from a separate element attached to the beam region 12.

In the embodiment shown in FIGS. 1 and 3, the base portion 40 of beam region 12 is generally triangularly shaped, having a peripheral edge forming an angle A1 with a longitudinal axis 50 of the suspension assembly 8. The shape of the base portion 40 is not limited to the triangularly shaped embodiment shown in FIGS. 1 and 3. For example, curved shapes, or combinations of curved and triangular shapes that provide suitable performance can be used. In the embodiments shown, the width of the base portion 40 is greatest at the intersection with the spring region 14. The width of the base portion 40 also continues to decrease with increasing distance from the spring region 14 in the illustrated embodiments.

The stiffener portion 42 of the beam region 12 is smaller than the base portion 40 (i.e., does not extend beyond the peripheral edges of the base portion 40 in the illustrated embodiment), and has a tapered shape of decreasing width with increasing distance from the spring region 14. The illustrated embodiment of the stiffener portion 42 has generally concave, curved peripheral edges that terminate at or near the edges of the base portion 40 at the proximal and distal ends of the base portion. The peripheral edges of the stiffener portion 42 shown in FIGS. 1 and 3 can be generally described as having a first or proximal curved portion 52 tangent to axis 54, a second or intermediate curved portion 55 tangent to axis 56, and a third or distal curved portion 58 tangent to axis 60. In the illustrated embodiment, longitudinal axis 50 forms angle A2 with axis 54, angle A3 with axis 56, and angle A4 with axis 60.

An important feature is the angles between the peripheral edges of the base portion 40 and the stiffener portion 42 at the proximal and distal ends of the beam region 12.

In one embodiment, the angles between the peripheral edges of the base portion 40 and the stiffener portion 42 at both the proximal and distal ends of the beam region 12 are between about 5° and 30°. In the embodiment illustrated in FIGS. 1 and 3, the angles between the peripheral edges of base portion 40 and stiffener portion 42 are about 14.5° at the proximal end of the beam region 12 and about 14.5° at the distal end. Generally, the angle between the peripheral edges of base portion 40 and stiffener portion 42 at the proximal portion of the beam region 12 is the difference between angles A1 and A2. The angles between the peripheral edges of base portion 40 and stiffener portion 42 at the distal portion of the beam region 12 is generally the difference between angles A1 and A4.

In still other embodiments (not shown), the peripheral edges of stiffener portion 42 can have different curved and/or linear shapes that provide suitable performance characteristics. For example, the peripheral edges of stiffener portion 42 can be substantially linear at its proximal and distal ends. Substantially linear edges of these types can intersect one another, or can be joined with an intermediate curved portion such as 55. In these alternative embodiments the angles between the peripheral edges of the base portion 40 and stiffener portion 42 at the proximal and distal ends of the beam region 42 will be between about 5° and 30° as in the embodiments described above.

Beam region 12 of load beam 10 also includes a hole or aperture 62 on the longitudinal axis 50. In the embodiment shown, the aperture 62 extends through layers 32, 34 and 36. In other embodiments (not shown) the aperture extends partially or completely through one or more of layers 32, 34 and 36. Aperture 62 is sized and located to reduce the mass of the load beam 10 while minimizing detrimental impacts on the stiffness of the beam region 12.

The peripheral edge of the stiffener portion 42 at its distal end can be offset by distance D1 from the adjacent peripheral edge of base portion 40 (i.e., the width of the distal end of the stiffener portion can be less than the width of the adjacent portion of the base region 40). The offset distance D1 can range between about 0 and 200 μm. However, it is generally preferred that the width of the distal end of the stiffener portion 42 not be reduced to a width less than that capable of providing sufficient stiffening functionality (e.g., a minimum width in one embodiment).

Figure 4:
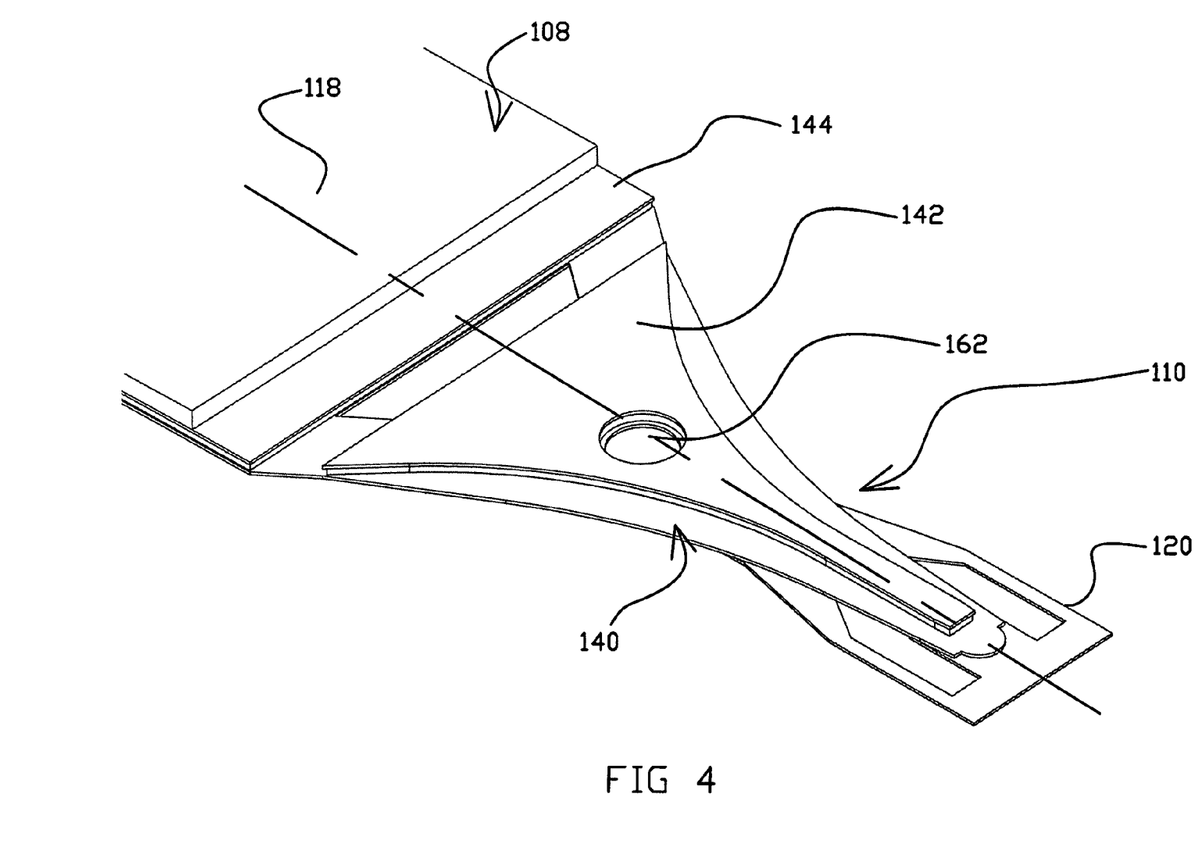
FIG. 4 is an isometric view of a portion of a suspension having a second load beam onto which a headlift in accordance with the present invention can be incorporated.
Figure 5:
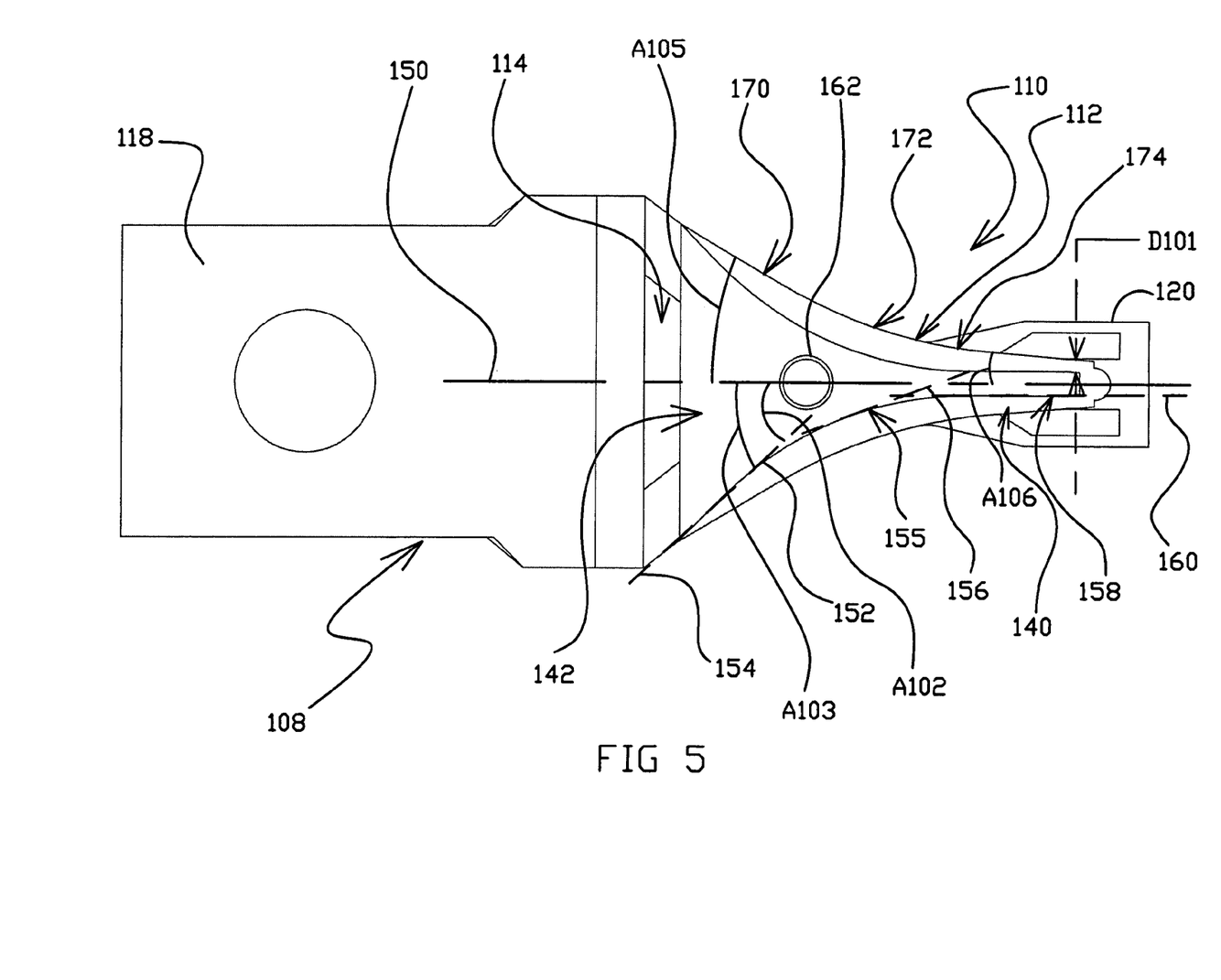
FIG. 5 is a top plan view of the suspension shown in FIG. 4.

FIGS. 4 and 5 are illustrations of a suspension assembly 108 including a second load beam 110 onto which a headlift in accordance with the invention (described below) can be incorporated. Suspension assembly 108 is similar to suspension assembly 8 described above, and similar features are identified by similar reference numerals in the "1xx" series. In particular, although generally triangular in shape, base portion 140 is narrower in profile than base portion 40 of the suspension assembly 8, and is shaped to include a peripheral edge having proximal linear portion 170, an intermediate curved portion 172 and a distal linear portion 174. In the illustrated embodiment, longitudinal axis 150 forms an angle A105 with proximal portion 170 and an angle A106 with the distal portion 174.

Stiffener portion 142 is generally narrower in profile than stiffener portion 42 of the suspension assembly 8. In the illustrated embodiment, longitudinal axis 150 forms angles A102 with axis 154, and angle A103 with axis 156. Axis 160 is generally parallel to axis 150 in the illustrated embodiment. In other embodiments (not shown) axis 160 forms a non-parallel angle with axis 150. Axis 156 is generally parallel to the tangent of the intermediate portion 172 of the peripheral edge of base portion 140.

The angles between the peripheral edges of the base portion 140 and the stiffener portion 142 at both the proximal and distal ends of the beam region 112 are between about 5° and 30° in one embodiment. In the embodiment illustrated in FIGS. 4 and 5, the angles between the peripheral edges of the base portion 140 and the stiffener portion 142 are about 15° at the proximal end and 5° at the distal end. The peripheral edge at the distal end of the stiffener portion 142 can also be offset from the adjacent edge of the base portion 140 by distance D101, which can be the same as or similar to the distance D1 described above in connection with load beam 10.

Suspensions having load beams such as 10 and 110 with tailored base portions 40 and 140 and stiffener portions 42 and 142, respectively, offer important advantages, especially in terms of resonance and shock performance. The relatively narrow stiffener portion decreases the amount of mass off the central longitudinal axis of the load beam, thereby enhancing torsional mode performance and bending frequencies. The wider, triangularly-shaped base portion increases the sway frequency. The decreased mass also enhances shock performance.

Figure 6:
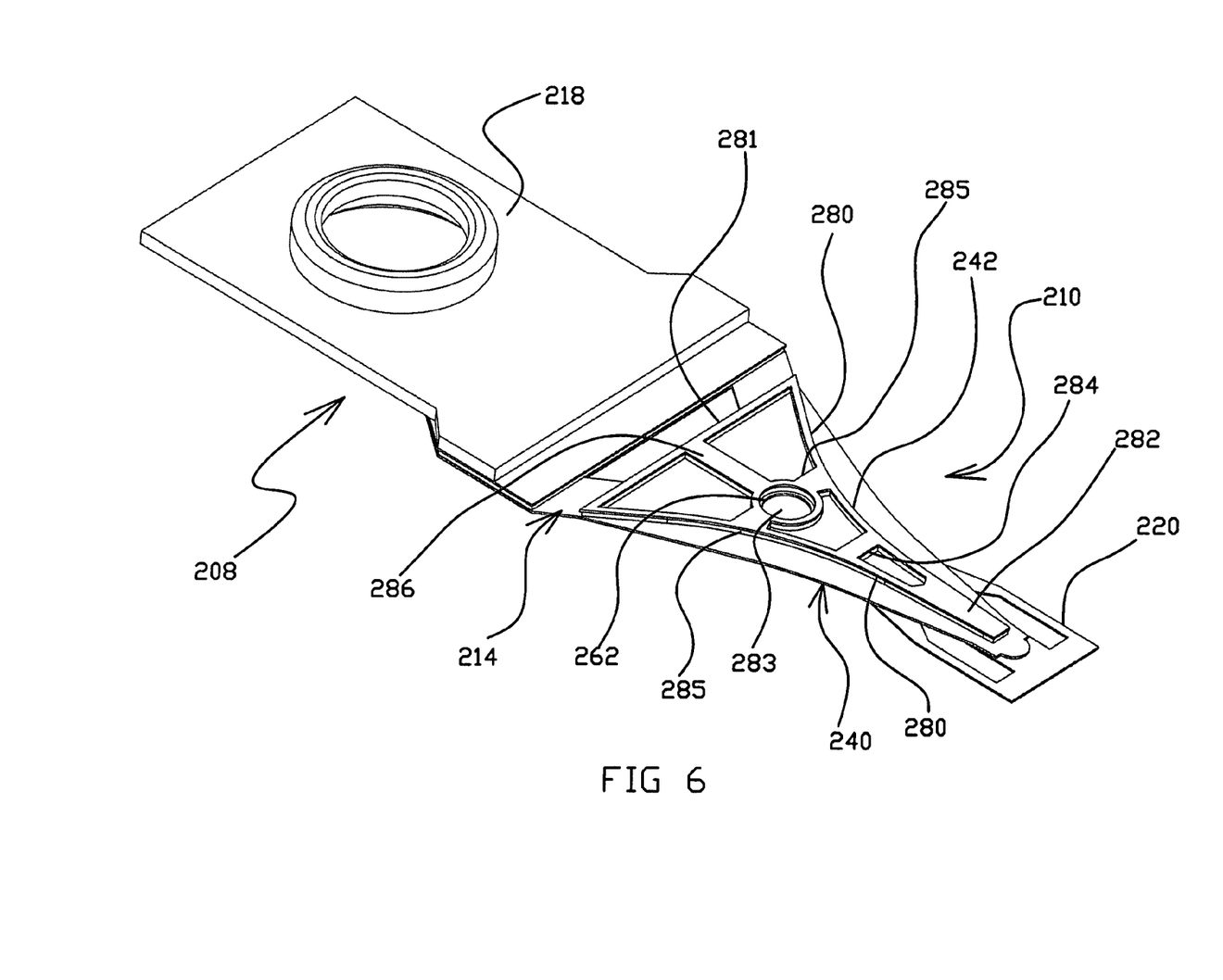
FIG. 6 is an isometric view of a suspension having a third load beam onto which a headlift in accordance with the present invention can be incorporated.

FIG. 6 is an illustration of a suspension assembly 208 having a third load beam 210 onto which a headlift in accordance with the invention (described below) can be incorporated. Suspension assembly 208 is similar to suspension assembly 8 described above, and similar features are identified by similar reference numerals in the "2xx" series. In particular, the stiffener portion 242 of load beam 210 includes cutouts, and is formed by a number of rails, rather than being a substantially solid member such as stiffener portion 42 of suspension assembly 8. As shown, stiffener portion 242 includes a pair of peripheral edge rails 280 that have distal ends joined to form a distal member 282, peripheral proximal edge rail 281 that extends between the proximal ends of the peripheral edge rails, and a circular rail 283 surrounding aperture 262. An intermediate rail 284 extends between the peripheral edge rails 280 at a location between the circular rail 283 and the distal member 282. A pair of intermediate rails 285 extend transversely between the opposite sides of the circular rail 283 and the peripheral edge rails 280. An intermediate rail 286 extends between the circular rail 283 and the proximal edge rail 281. In the embodiment shown, rail 286 extends along the central longitudinal axis of the load beam 210. The width dimensions of rails 280-286 range between 75 and 400 μm in one embodiment. The general shape of stiffener portion 242 can be the same as that of stiffener 42 of load beam 10 described above. Other than the stiffener portion 242, suspension 210, and in particular base portion 240, can be the same or similar to that of base portion 40 of load beam 10 described above. Similar manufacturing processes can also be used to manufacture the suspension 210. The narrow strips or rib provide a stiffener offering many of the same advantages as stiffener 42 described above, with even greater mass reduction. Other embodiments (not shown) can have ribs of other sizes, locations, numbers and configurations.

Figure 7:
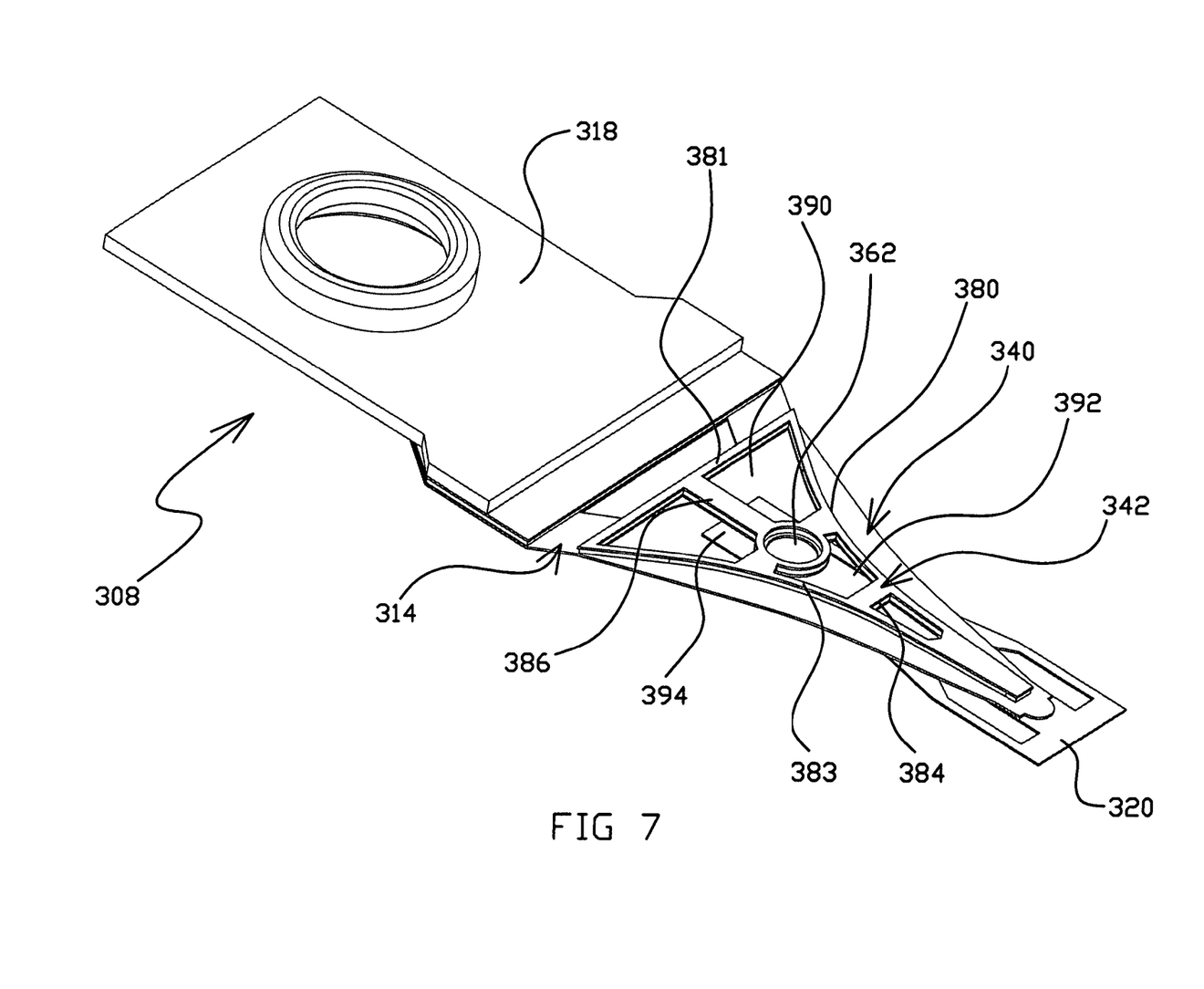
FIG. 7 is an isometric view of a suspension having a fourth load beam onto which a headlift in accordance with the present invention can be incorporated.

FIG. 7 is an illustration of a suspension assembly 308 having a fourth load beam 310 onto which a headlift in accordance with the invention (described below) can be incorporated. Suspension assembly 308 is similar to suspension assembly 208 described above, and similar features are identified by similar reference numerals in the "3xx" series. In particular, the base portion 340 of the load beam 310 includes cutouts, rather than being a substantially solid member such as the base portion 240 of suspension assembly 208. As shown, base portion 340 includes a cutout region 390 between the circular rail 383, proximal edge rail 381 and peripheral edge rails 380. A cutout region 392 is located between the circular rail 383 and the intermediate rail 384. In the illustrated embodiment, cutout region 390 encompasses a substantial portion of the base portion 340 between the circular rail 383, proximal edge rail 381 and peripheral edge rails 380, with a relatively small pad 394 remaining between the circular rail and the proximal edge rail. The pad 394 can be used as a base for welding a mounting region (not shown) of the flexure 320 to the load beam 310. Cutout 392 encompasses a substantial portion of the base portion 340 between the circular rail 383 and the intermediate rail 384. In the embodiment shown, the base portion 340 is whole between its peripheral edges and the peripheral edge rails 380 of the stiffener portion 342. Other than the cutouts such as 390 and 392, suspension 310, and in particular the shape and other aspects of base portion 340, can be the same or similar to those of base portion 240 of load beam 210 described above. The cutouts provide a base portion offering many of the same advantages as base region 240 described above, with even greater mass reduction. Other embodiments (not shown) can have cutouts of other sizes, locations, numbers and configurations.

Figure 8:
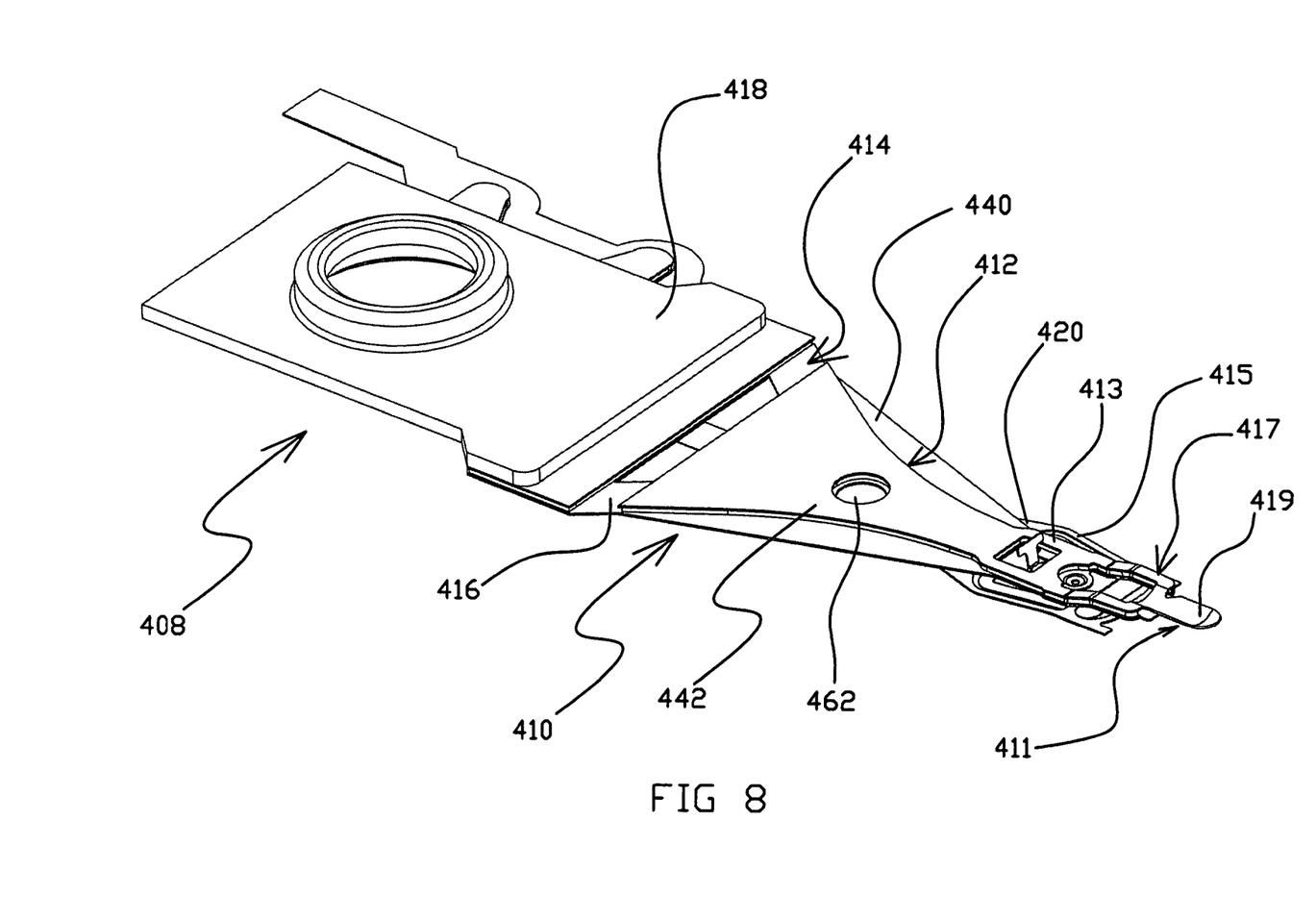
FIG. 8 is an isometric view of a portion of a suspension having a load beam and headlift in accordance with one embodiment of the present invention.

FIG. 8 is an illustration of a suspension assembly 408 including a load beam 410 and headlift 411 in accordance with the present invention. With the exception of the headlift 411, suspension assembly 408, including the beam region 412 of the load beam 410, are similar to suspension assembly 8 and load beam 10 described above, and similar features are identified by similar reference numerals in the "4xx" series.

Figure 9:
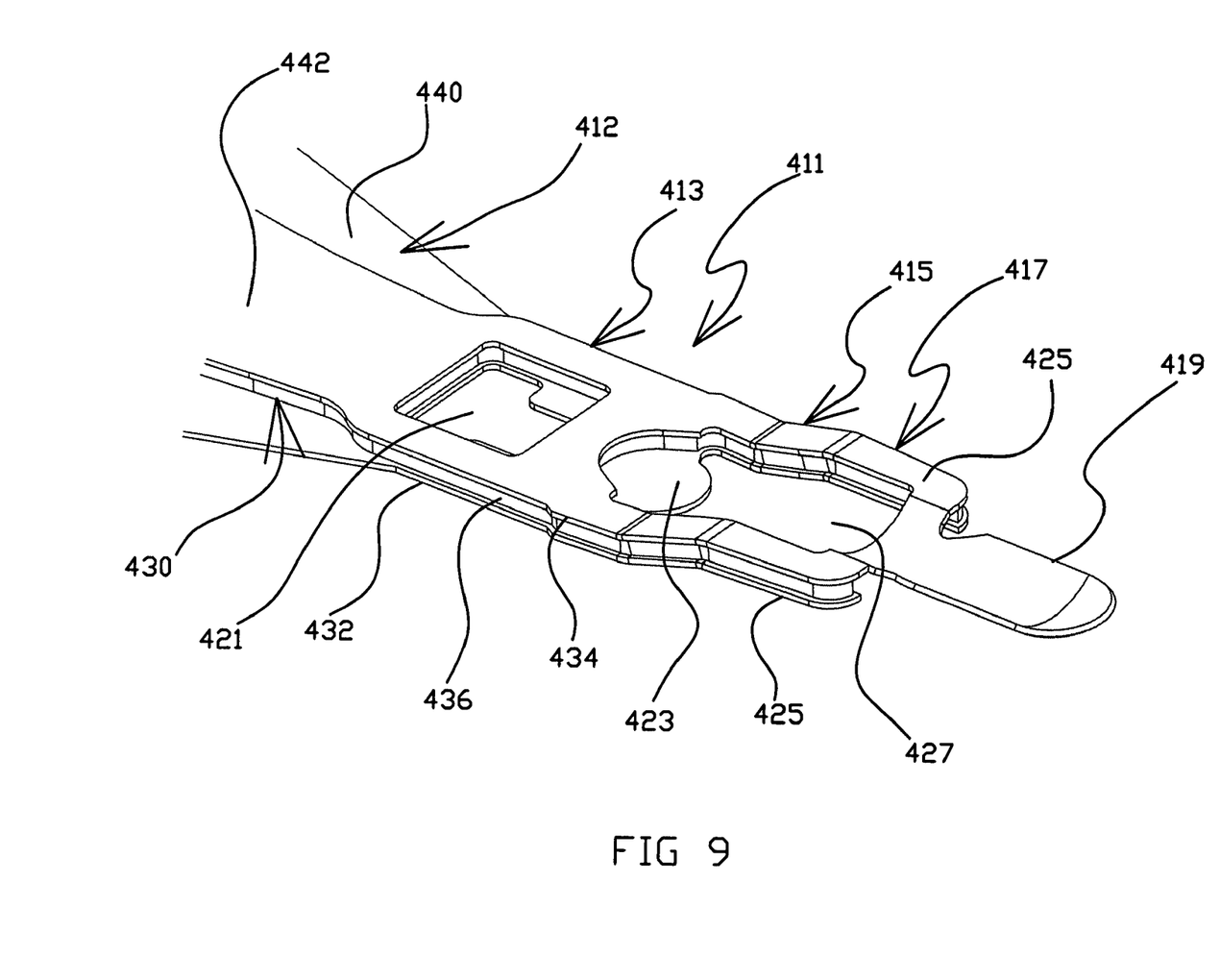
FIG. 9 is a detailed isometric view of a first side of the headlift shown in FIG. 8.
Figure 10:
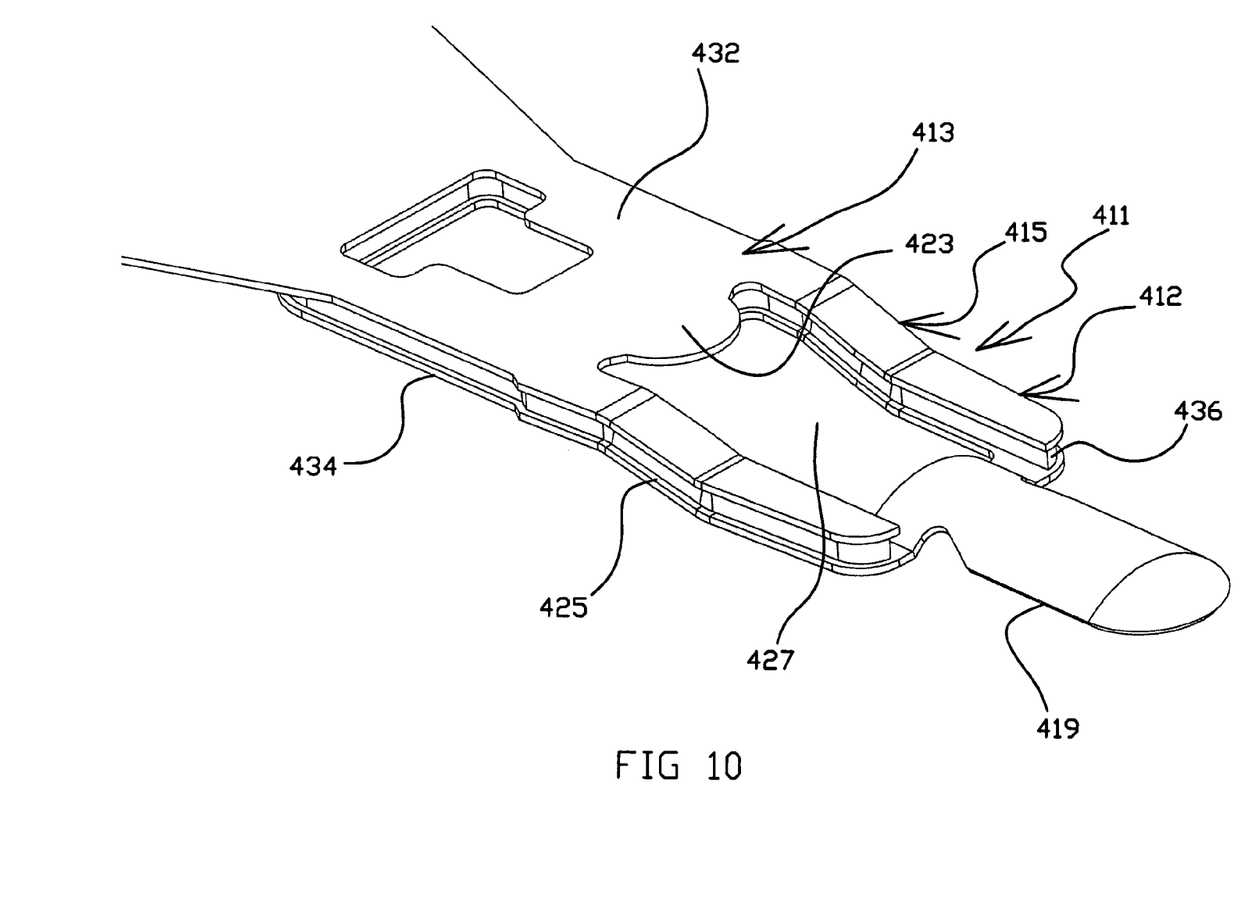
FIG. 10 is a detailed isometric view of a second side of the headlift shown in FIG. 8.

FIGS. 9 and 10 are illustrations of the opposite sides of the headlift 411. As shown, the headlift 411 includes a support region 413, offset region 415, support region 417 and tab 419. The support region 413 extends from the distal end of the beam region 412. In the illustrated embodiment the support region 413 is generally planar and includes a cutout or aperture 421 and a load point location surface 423. The offset region 415 extends out of the plane of support region 413 to offset the location of the tab 419 (in what is known as the z-height direction) from the plane of other load beam structures such as the beam region 412 and headlift support region 413. Support region 417 extends from the offset region 415. The tab 419 extends distally from the support region 417. Offset region 415 and support region 417 are formed as a pair of beams 425 extending from opposite sides of the support region 413. The tab 419 extends between the distal ends of the beams 425. The tab 419, beams 425 and support region 413 surround a cutout or aperture 427.

Offset region 415 extends generally away from base portion 440 in a direction toward stiffener portion 442 in the illustrated embodiment. In other embodiments (not shown) the offset region 415 extends generally away from base portion 440 in a direction away from the stiffener portion 442. Tab 419 has a generally concave shape and rounded tip in the illustrated embodiment. The concave shape enhances the rigidity of the tab 419. In other embodiments (not shown) the tab 419 has other shapes and profiles. The direction of the offset of region 415 is typically selected so that it will extend away from the surface of a disk (not shown) when the load beam is mounted for use in a disk drive (not shown).

Other embodiments of the headlift (not shown) do not include a support region 417 between the offset region 415 and the tab 419. In these embodiments the tab 419 extends directly from the offset region 415. Still other embodiments of the invention (also not shown) do not include a support region 413, but instead have the offset region 415 extending directly from the beam region 412. In yet other embodiments (not shown) the tab 419 extends directly from the distal end of the beam region 412 (i.e., the beam region effectively functions as a support region for the tab). Apertures 421 and 427 are not present, or have different shapes, in other alternative embodiments of the invention.

Headlift 411 is preferably formed from the same laminated sheet of material 430 as beam region 412. In the illustrated embodiment the support region 413 (with the exception of the load point surface 423), offset region 415 and support region 417 are all formed from the first layer 432, second layer 434 and etch stop layer 436 of the laminated material 430. The tab 419 is formed only from the second layer 434 of laminated material 430 in this embodiment. In other embodiments (not shown), support region 413, offset region 415 and/or support region 417 (or at least portions of these regions) can be formed only from the first layer 432 or the second layer 434, or from either the first or second layer and etch stop layer 436. In still other embodiments (not shown) the tab 419 is formed from only the first layer 432, or from either the first layer or second layer 434 and the etch stop layer 436. Conventional or otherwise known photolithography and etching processes, and mechanical bending, forming or stamping processes, can be used to manufacture the headlift 411.

Although headlift 411 is shown as an element of load beam 410, which is similar to load beam 10 described in connection with FIGS. 1 and 3, it is to be understood that headlifts such as 411 can alternatively be incorporated onto load beams similar to those described in connection with FIGS. 4-7. Headlifts such as 411 can also be incorporated onto other load beam structures (not shown) manufactured from laminated sheets of material, and onto other conventional or otherwise known load beams such as those manufactured from a single sheet of material. In still other embodiments (not shown), headlifts such as 411 are manufactured as a separate element and welded or otherwise attached to the beam region of the load beam, including load beams of the type described in this document, other load beam structures manufactured from laminated sheets of material, or other conventional or otherwise known load beams such as those manufactured from a single sheet of material.

Headlifts in accordance with the invention offer a number of important advantages. The illustrated embodiment having the tab formed from the top layer of the laminate with the concave surface extending toward to bottom layer reduces profile impact during forming operations. The laminated structure provides stiffness without additional rails. The laminate stiffness is also maintained intact through the distal end of the headlift since all the layers of the laminate are formed. The headlift can also be efficiently manufactured.

Although the present invention has been described with reference to preferred embodiments, those skilled in the art will recognize that changes can be made in form and detail without departing from the spirit and scope of the invention.

What is claimed is:

1. A headlift for a disk drive head suspension, the headlift formed by etching from a laminated sheet of material having first and second relatively stiff layers separated by a third etch stop layer, including:
   a load point location surface formed from one of the first and second layers of the laminated sheet;
   a support region including at least portions formed from the first, second and third layers of the laminated sheet at a location distal of the load point location; and
   a tab extending from the support region and formed from only one of the first and second relatively stiff layers, and optionally from the etch stop layer.

2. The headlift of claim 1 wherein the support region includes an aperture.

3. The headlift of claim 1 and further including an offset region between the support region and the tab for providing an offset between the support region third layers of the laminated sheet.

4. The headlift of claim 3 wherein the offset region includes an aperture.

5. The headlift of claim 3 wherein all portions of the offset region are formed from the first, second and third layers of the laminated sheet.

6. The headlift of claim 3 wherein the tab has a concave surface.

7. The headlift of claim 3 and further including a second support region between the offset region and the tab, the second support region including at least portions formed from the first, second and third layers of the laminated sheet.

8. The headlift of claim 7 wherein the second support region includes an aperture.

9. The headlift of claim 7 wherein all portions of the second support region are formed from the first, second and third layers of the laminated sheet.

10. The headlift of claim 7 wherein the tab has a concave surface.

11. The headlift of claim 1 wherein the first and second layers are metal layers.

12. The headlift of claim 1 wherein the tab has a concave surface.

13. A load beam or load beam component formed by etching from a laminated sheet of material having first and second metal layers separated by a third etch stop layer, including:
   a beam region, including:
      a base portion having peripheral edges and a load point location surface formed from the first layer; and a stiffener portion having peripheral edges formed from the second layer; and a headlift extending distally from the beam region and including:

a tab formed from only the first or second layer.

14. The load beam or load beam component of claim 13 wherein the headlift further includes an offset region between the beam region and the tab for providing an offset between the beam region and the tab, the offset region including at least portions formed from the first, second and third layers of the laminated sheet.

15. The load beam or load beam component of claim 14 wherein all portions of the offset region are formed from the first, second and third layers of the laminated sheet.

16. The load beam or load beam component of claim 15 wherein the tab is formed from the second layer.

17. The load beam or load beam component of claim 16 wherein the tab has a concave surface.

18. The load beam or load beam component of claim 13 wherein:

the base portion of the beam region has a tapered shape with a continuously decreasing width with increasing distance from a proximal end of the beam region; and the stiffener portion has a tapered shape with a continuously decreasing width with increasing distance from a proximal end of the beam region, and generally concave peripheral edges.

19. The load beam or load beam component of claim 18 wherein angles between the peripheral edges of the base portion and the stiffener portion at proximal and distal ends of the beam region are between about 5° and 30°.

20. The load beam or load beam component of claim 12 wherein the tab is formed from the second layer.

* * * * *

UNITED STATES PATENT AND TRADEMARK OFFICE
CERTIFICATE OF CORRECTION

PATENT NO.         : 7,375,927 B1                               Page 1 of 1
APPLICATION NO. : 11/116541
DATED              : May 20, 2008
INVENTOR(S)        : Mark A. Miller It is certified that error appears in the above-identified patent and that said Letters Patent is hereby corrected as shown below:

Column 8, line 37 Claim 3, after "support region" insert --and the tab, the offset region including at least portions formed from the first, second and--

Signed and Sealed this

Fifth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,375,927 B1 Page 1 of 1
APPLICATION NO. : 11/116541
DATED : May 20, 2008
INVENTOR(S) : Mark A. Miller It is certified that error appears in the above-identified patent and that said Letters Patent is hereby corrected as shown below:

Column 10, line 15, delete "12" and insert therefor --13--

Signed and Sealed this

Eleventh Day of November, 2008

JON W. DUDAS
*Director of the United States Patent and Trademark Office*